United States Patent
Stander

(10) Patent No.: US 9,446,362 B2
(45) Date of Patent: Sep. 20, 2016

(54) PROCESS AND DEVICE FOR UNLOADING PARTICULATE MATERIAL FROM A VESSEL

(71) Applicant: PETROVAL, Saint Romain de Colbosc (FR)

(72) Inventor: Adriaan Stander, Fontenay (FR)

(73) Assignee: PETROVAL, Saint Romain de Colbosc (FR)

( * ) Notice: Subject to any disclaimer, the term of this patent is extended or adjusted under 35 U.S.C. 154(b) by 119 days.

(21) Appl. No.: 14/021,191

(22) Filed: Sep. 9, 2013

(65) Prior Publication Data

US 2014/0069507 A1 Mar. 13, 2014

(30) Foreign Application Priority Data

Sep. 10, 2012 (EP) .................................... 12306085

(51) Int. Cl.
| | |
|---|---|
| B65G 53/00 | (2006.01) |
| B01J 4/00 | (2006.01) |
| B01J 8/00 | (2006.01) |
| B65G 53/42 | (2006.01) |

(52) U.S. Cl.
CPC ................ B01J 4/001 (2013.01); B01J 8/004 (2013.01); B65G 53/42 (2013.01); *B01J 2208/00761* (2013.01); *Y10T 137/0318* (2015.04); *Y10T 137/8593* (2015.04)

(58) Field of Classification Search
USPC ................ 406/137, 143, 194, 196, 197, 198
See application file for complete search history.

(56) References Cited

U.S. PATENT DOCUMENTS

| | | | |
|---|---|---|---|
| 1,339,977 A | * | 5/1920 | Pruden .......................... 406/133 |
| 3,911,971 A | | 10/1975 | Smithson et al. |
| 4,560,094 A | | 12/1985 | Eales |
| 5,464,528 A | * | 11/1995 | Owen ..................... C10G 11/18 208/113 |
| 5,474,111 A | * | 12/1995 | Williamson et al. ............. 141/1 |
| 6,182,716 B1 | * | 2/2001 | Fry ......................... B01J 8/0025 134/166 C |

FOREIGN PATENT DOCUMENTS

| | | |
|---|---|---|
| DE | 1 214 147 | 4/1966 |
| DE | 2 242 855 | 3/1974 |
| EP | 0 054 340 A1 | 6/1982 |
| FR | 1 371 381 | 1/1964 |
| FR | 1 371 381 | 9/1964 |
| GB | 2 323 586 A | 9/1998 |
| JP | 57-6430 | 2/1982 |
| WO | 94/20396 A1 | 9/1994 |
| WO | 98/02239 A1 | 1/1998 |

OTHER PUBLICATIONS

Extended European Search Report issued May 7, 2013, in Patent Application No. 12306085.7, filed Sep. 10, 2012.

* cited by examiner

*Primary Examiner* — Joseph Dillon, Jr.
(74) *Attorney, Agent, or Firm* — Oblon, McClelland, Maier & Neustadt, L.L.P.

(57) ABSTRACT

The present invention concerns a process for unloading a bed (2) of particulate material from a vessel (1), which comprises inserting a removable and portable extraction pipe (4) into the lower part of said bed, injecting a fluidization gas upwardly into the extraction pipe (4) from the bottom part thereof, along the entire length of the extraction pipe (4), and applying a positive pressure differential between the inlet and the outlet of said extraction pipe.

The present invention further concerns a device suitable for implementing such a process.

10 Claims, 2 Drawing Sheets

PROCESS AND DEVICE FOR UNLOADING PARTICULATE MATERIAL FROM A VESSEL

The present invention relates to a process for removing a particulate material from a vessel containing such material.

The process of the present invention is particularly suitable for removing particles of spent catalyst from an industrial reactor containing them.

The present invention further concerns a device suitable for implementing such a process.

Many industrial processes require the use of solid material in the form of small particles. Examples of such material commonly used in the form of small particles are solid catalysts such as those used in chemical, petrochemical and petroleum refining processes.

Such solid catalysts are often used as one or more bed(s) of particles arranged in a reactor. The reactor can contain one single bed of catalyst particles, or several beds of the same or of different kinds of catalysts. When more than one bed is present in a single reactor vessel, the beds are generally separated in the vertical direction, and with each bed supported on its own support tray.

During its use in the reactor, the catalyst becomes progressively de-activated, and the spent catalyst must then be unloaded from the reactor, for disposal or recycling thereof.

The unloading of catalysts from a single bed reactor, or from the bottom bed in a multi-bed reactor is generally performed using simple gravity flow via dump nozzles which are present in the bottom head of the reactor.

The unloading of catalyst from the upper beds in multi-bed axial flow reactors can pose additional difficulties. In some cases, inter-bed transfer pipes are used, in which case all the catalysts are unloaded via the bottom dump nozzle as a mixture of all the beds, because as soon as the bottom bed starts emptying, the upper beds will flow via the transfer pipes into the bottom bed.

This mixing is often not acceptable, in particular when the catalyst is to be recovered for re-use. In this case, the beds must be unloaded individually.

The usual design practice is therefore to install side dump nozzles at the bottom of each of the upper beds, which protrude through the reactor side wall.

Whatever the design of the reactor (one or more beds of catalyst, with one or more dump nozzles), an inventory of solid particles will only flow under gravity through a dump nozzle once the nozzle exceeds a certain minimum slope (called the angle of repose). This angle of repose varies for different catalysts, and is dependent on several physical factors such as size, shape surface condition, but is often of the order of around 45°.

However, the design and construction of sloped penetration welds through thick-walled, high pressure vessels is difficult and expensive, and thus designers often install horizontal dump nozzles in the upper beds. These dump nozzles cannot serve their intended purpose, to allow unloading of the bed purely with gravity flow. Indeed as explained above, for a dump nozzle to allow catalyst to flow under gravity, it needs to be sloped downwards at a minimum angle value, corresponding to the angle of repose.

Unloading of catalyst particles from a bed equipped with a horizontal dump nozzle is therefore in practice usually done by vacuuming the particles from the top of the bed. This process has several drawbacks:

Vacuuming of the catalyst usually results in severe breakage of the catalyst particles, in some cases as much as 50% but seldom less than 20%. If the intention is to recover the catalyst for reuse, this breakage represents a very significant loss of material, as the broken catalyst particles cannot be re-used and must be segregated (screened) and disposed.

Vacuuming is a slow process, which impacts on the duration of the shutdown of the reactor, which can result in a significant economic loss due to reduced production availability of the unit of which the reactor forms part.

Vacuuming usually requires entry into the vessel (which is typically under an inert gas blanket), which requires sophisticated life support equipment and procedures, and specially trained personnel. Even then, inert entry is a hazardous activity, and there is a strong desire to minimise this work as much as possible.

Vacuuming of a bed of catalyst can also be done by inserting the vacuum hose into the bed via a dump nozzle at the bottom of the bed. This largely avoids the third of the above-mentioned problems, viz. there is reduced need for entry into the vessel, but does not address the first two, viz. the breakage of the particles and the speed of unloading. In addition, it adds a complexity in that, when inserted into the bottom of the bed, the vacuum hose can easily become choked.

As an alternative solution, an Archimedean screw type device, called a catalyst auger, can be used in the horizontal dump nozzle to physically extract the catalyst. While this device has the advantage of extracting the catalyst without the aforementioned inert entry, it is still very slow, and also creates significant breakage of the catalyst. Safety concerns have also been raised due to some fire experiences during use.

A further alternative solution is described in patent application WO 94/20396, which describes a vacuum apparatus comprising a suction pipe connected to a vacuum apparatus. The end of the suction pipe comprises jetting means, arranged to provide a plurality of jets of gas all around the tip of the pipe and directed radially into the pipe, in order to agitate the catalyst around the tip of the pipe and allow it to be sucked up by the vacuum hose.

However, such a device is not sufficiently efficient. It requires applying a high vacuum to the outlet of the suction pipe, to induce particles to flow along the pipe. Furthermore, a large volume of gas needs to be injected at the inlet end of the suction pipe to keep the gas flow velocity inside the vacuum hose high enough to entrain the vacuumed catalyst particles.

Also, it results in a high level of breakage of catalyst particles, as the particles are carried along at a high velocity, and direction changes such as bends and elbows in the system will result in particles being impacted against the outside wall of the conduit. In essence it is simply a method to make traditional vacuuming of the bed easier to control, by supplying additional gas to avoid choking, but does nothing to mitigate any of the other problems associated with the process of vacuuming.

The present invention aims at providing an improved process, which allows the unloading of particulate material from a container vessel in a rapid and effective manner, while minimizing the risks of breaking such particles.

The present invention further provides a removable and portable device for implementing such a process, which can be used in a simple, effective and safe manner. In particular, such a device can be inserted into existing horizontal dump nozzles provided in existing industrial reactors, without mechanical modifications of the reactor in question.

The present invention therefore concerns a process for unloading a bed of particulate material from a vessel, which comprises inserting a removable and portable extraction pipe into the lower part of said bed, injecting a fluidization gas upwardly into said extraction pipe from the bottom part thereof along the entire length of the extraction pipe, and applying a positive pressure differential between the inlet and the outlet of said extraction pipe.

The purpose of said fluidization gas is not to entrain the particles in a high velocity gas stream, but rather to create a localised dense fluidized phase of particulate material inside the extraction pipe, along its length. As such the flow rate of the fluidization gas can and should be advantageously controlled to the minimum required to achieve this fluidized state.

Once in such a fluidized state, the particles inside the extraction pipe will behave in a fashion similar to a liquid, and will flow under the influence of the pressure differential between the two ends of the extraction pipe, regardless of the angle of the pipe, including horizontal. The pressure being higher at the inlet than at the outlet of the extraction pipe, the inventory of fluidized particle will flow towards the outlet.

As a consequence, the particulate material flows by simple pressure differential in a fluidized state out of the vessel, without any substantial breakage thereof. As the inventory of fluidized material flows out of the extraction pipe, it is continuously replenished by additional material collapsing from the packed bed above, into the inlet scoop of the extraction pipe.

The process of the invention is very efficient, and allows unloading of beds of particulate material in a safe and quick manner. Furthermore, by transporting the particles at a relatively low velocity in a dense phase, it avoids the breakage that is associated with the high velocity dilute phase vacuuming process.

The flow rate of particulate material exiting the vessel can be controlled, in particular by adjusting the pressure differential between the inlet and the outlet of the extraction pipe.

At the outlet of the extraction pipe, the particulate material exiting the vessel is simply separated from the fluidization gas, using any suitable means. Such means of separation are well known to one skilled in the art, and include for example cyclone separators or any other gas/solid disengagement device.

By "dense fluidized phase of particulate material", it is meant that sufficient fluidization gas is injected to maintain the particles in a vertically suspended state, but without any significant vertical transportation of the particles.

The fluidization gas is injected along the entire length of the extraction pipe, that is to say, from its inlet (inside the vessel) to its outlet (outside of the vessel). This insures that the fluidization is maintained over the entire length of the path within the extraction pipe. Indeed, if at any point the fluidization is lost, there is a risk that the particles will slump back to create a local bed, which could result in a blockage of the extraction pipe.

The fluidization gas used in the invention can be any gas which is compatible with the nature of the particulate material, and of the process that was carried out in the vessel.

It can be chosen in particular from air, water vapour, oxygen, hydrogen, inert gases such as nitrogen, and mixtures thereof in any proportions.

The fluidization gas is preferably chosen from inert gases, such as in particular nitrogen.

When the particulate material is a spent catalyst, the use of an inert gas as fluidization gas is preferable because it avoids any risk of self ignition phenomena when the gas contacts the used catalyst (the latter being potentially self-heating and pyrophoric), which could be hazardous, and damage the catalyst particles as well as the equipment.

According to the invention, a small positive pressure differential is advantageously applied between the inlet and the outlet of the extraction pipe, to keep the flow of particulate material out of the vessel. That is to say, a pressure is applied so that the pressure remains higher at the inlet of the extraction pipe (inside the vessel) than at the outlet of the extraction pipe (outside the vessel).

By small pressure differential, it is meant a pressure differential of at most $1.10^4$ Pa (that is to say, not more than about 0.1 bar).

The pressure differential can be applied either by applying a higher pressure inside the vessel, while keeping the outlet of the extraction pipe at atmospheric pressure, or by keeping the vessel at atmospheric pressure while applying a vacuum to the outlet of the extraction pipe.

In this latter embodiment, the extraction system of the invention is not a vacuum or suction system as those known in the prior art, where removal of the particles is essentially done by vacuuming. These vacuuming systems require applying a relatively deep vacuum so as to induce a large gas flow in order to pick up and entrain the particles as a dilute phase in a high velocity gas stream. As noted earlier, these systems are not very efficient, quite hazardous, and provoke substantial catalyst breakage.

The preferred alternative consists in applying a higher positive pressure inside the vessel. This is to ensure that, in the event of a small leak in the system, the blanketing gas will flow outwards through the leak. In the embodiment where the pressure differential is applied by vacuum, a small leak would result in air being sucked in through the leak. In the event of air being aspirated into the system, the oxygen present in the air could induce self-heating of the spent catalyst.

Such a positive pressure can be applied at the top of the particulate material bed, preferably after the top of the vessel has been sealed with a temporary lid. This can be done by injecting a gas (which can be of the same nature as the fluidization gas, such as preferably an inert gas) into the upper part of the vessel, above the bed of particulate material.

Such a pressure can also be applied within the bed of particulate material, at the inlet of the extraction pipe. This can be done for example by injecting an additional amount of gas (which can be of the same nature as the fluidization gas, such as preferably an inert gas) at the inlet of the extraction pipe, so as to create a localised region of high pressure at the inlet, and thus the pressure differential between the inlet and the outlet of the extraction pipe. The system for injection of this pressurisation gas is separate and independent from the fluidization gas injection system.

According to a further preferred embodiment, a part or all of the fluidization gas is removed along the length of the extraction pipe, in the upper part thereof.

Thus, according to this embodiment, the injection of fluidization gas creates a cross-flow of gas, from the bottom to the top of the extraction pipe, along its length.

This embodiment avoids having a cumulative increase of gas along the length of the extraction pipe.

This embodiment further allows a better control of the density of the fluidized phase of particulate material along the length of the extraction pipe. In particular, the density of the fluidized phase of particulate material can advantageously be kept constant along the length of the extraction pipe. This embodiment further facilitates the separation of the particulate material from the fluidization gas, at the outlet of the extraction pipe.

The fluidization gas injected into the extraction pipe from the bottom part thereof can be directed perpendicularly to the lengthwise axis of said pipe. It can also be injected in an inclined direction towards the outlet of the extraction pipe.

In a preferred embodiment, the fluidization gas is injected into the extraction pipe in an inclined direction towards the outlet of the extraction pipe, with an inclination angle with regard to the lengthwise axis of said pipe ranging from 0 to 90 degrees, preferably of 45 degrees.

Inclining the injection of fluidization gas further helps, in combination with the positive pressure differential between the inlet and the outlet of the extraction pipe, the flow of fluidized particulate material towards the outlet of the extraction pipe.

As already stated, the extraction pipe is inserted into the lower part of the bed of particulate material, and more preferably at the bottom part thereof.

The extraction pipe does not particularly need to penetrate too deeply into the bed of particulate material, only deep enough for the inlet to be entirely covered by the bed of particles. This will ensure that there is a continuous supply of material from the bed of particles to replenish the material that is being extracted.

The present invention can in particular be used for removing particles of a solid catalyst (such as a used catalyst) out of a reactor.

In this case, for inserting the extraction pipe into the bed of catalyst particles, use can advantageously be made of the side dump nozzles (such as horizontal or inclined dump nozzles) which are present on some reactors and which protrude through the reactor walls, at the bottom of each bed of catalyst.

The extraction pipe can be inserted through such dump nozzles, and should be sealed tightly to the flange thereof.

The system of the present invention does not particularly require that the extraction pipe be inclined downwards to cause the particulate material to flow out of the vessel. Therefore the extraction pipe can be either kept horizontal, or inclined downwardly, with an angle with regard to the horizontal that is inferior or equal to 45 degrees, preferably inferior or equal to 30 degrees, even more preferably inferior or equal to 15 degrees. According to a preferred embodiment, in particular when used through a horizontal dump nozzle, it is kept horizontal.

This represents an important advantage of the present invention, that is to say, it allows an efficient and satisfying unloading of the particles even through horizontal dump nozzles that are present on some reactors.

The present invention further concerns a device suitable for implementing the process of the present invention.

In particular, the present invention concerns a device for unloading particulate material from a vessel, comprising an extraction pipe which comprises along the entire length of its bottom part injection means suitable for injecting a fluidization gas upwardly into said extraction pipe.

Preferably, the injection means comprise means for injecting a multiplicity of small jets of gas into the extraction pipe.

Such multiple jets can be obtained by different methods.

According to a first embodiment, the injection means comprise a chamber present along the length of the bottom part of the extraction pipe, in particular an injection chamber delimited by the inner and the outer surfaces of the bottom part of the pipe, such chamber being provided with a plurality of jetting apertures protruding through the inner surface of the bottom part of the pipe.

The injection chamber is connected to a supply of pressurized fluidization gas.

According to a second embodiment, the injection means comprise a set of high pressure tubes, which are provided with small holes over their length.

Such high pressure tubes are present along the entire length of the bottom part of the extraction pipe.

The pressure tubes are connected to a supply of pressurized fluidization gas.

The size of the holes in the pressure tubes can be such that a reasonably high pressure (around $2.10^5$ to $6.10^5$ Pa) can be applied inside the tubes, to create a high pressure drop over the individual vent holes to equalise the fluidization gas flow over the length of the extraction pipe.

According to a preferred embodiment of the invention, the device further comprises means for removing fluidization gas along the length of the extraction pipe, in the upper part thereof.

Such means can comprise for example a collection chamber located along the upper length of the extraction pipe, such as a chamber delimited by the inner and the outer surfaces of the upper part of the pipe, such chamber being provided with a plurality of apertures protruding through the inner surface of the upper part of the pipe. Such chamber is advantageously vented to the atmosphere, separate from the main extraction pipe outlet.

The collection chamber can be connected to gas extraction means, such as a vacuum system, in order to increase the amount of fluidization gas that is removed via the collection chamber.

In a further embodiment of the device, such collection chamber can be replaced by one or more tubes with apertures, located in the upper part of the extraction pipe. These tubes can be connected together to create a more efficient fluidization gas removal system.

In a less preferred embodiment of the device, no fluidization gas removal system is provided, and the fluidization gas is allowed to exit the extraction pipe together with the catalyst.

The device of the invention can advantageously further comprise a separate means for injecting an additional amount of gas at the inlet of the extraction pipe, so as to apply a pressure differential between the inlet and the outlet of the extraction pipe.

The extraction pipe of the invention can be made of any hard wearing material, such as metallic material, or hard wearing plastics.

The other means of the device of the invention (such as high pressure tubes) can be made of the same type of materials.

According to an advantageous embodiment, the transverse dimensions of the extraction pipe are such that the pipe can be inserted through the dump nozzles of an industrial reactor, and sealed tightly onto the flange thereof. A tight sealing of the extraction pipe unto the nozzle of the reactor is preferred, in order to be able to create and maintain the pressure differential between the inlet and the outlet of the extraction pipe.

The inlet of the extraction pipe can be advantageously scoop-shaped, in order to facilitate the entrance of the particles into said pipe.

The invention will now be further illustrated in a non limitative embodiment and by way of example only, with reference to the accompanying drawings, in which.

Figure 1:
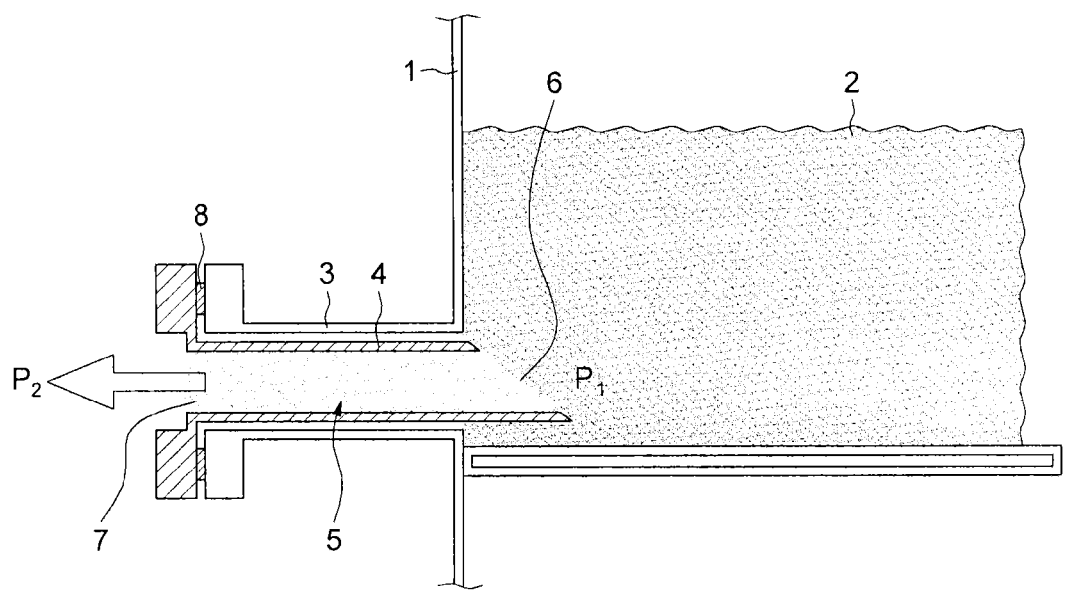
FIG. 1 is a schematic illustration of the principle underlying the present invention.

Referring to FIG. 1, a vessel 1 such as a reactor comprises a bed 2 of particulate material such as catalyst particles.

The reactor further comprises a horizontal dump nozzle 3 protruding outside of the reactor 1.

According to the invention, an extraction pipe 4 has been inserted through the dump nozzle 3 into the lower part of the bed 2, and sealed onto the nozzle by means 8.

The extraction pipe 4 comprises injection means (not shown) along the entire length of its bottom part. A fluidization gas is injected upwardly into the extraction pipe 4 through such injection means, at a rate that is just high enough to create a dense fluidized bed 5 of particles all along the length of the extraction pipe 4.

The pressure P1 in the bed 2 at the inlet 6 of the extraction pipe 4 is higher than the pressure P2 at the outlet 7 of the extraction pipe 4.

Under this pressure differential between P1 and P2, the fluidized particles 5 flow from the inlet 6 towards the outlet 7 of the extraction pipe 4, out of the vessel 1, where they can be separated from the fluidization gas using gas/particles separation means not shown.

Figure 2:
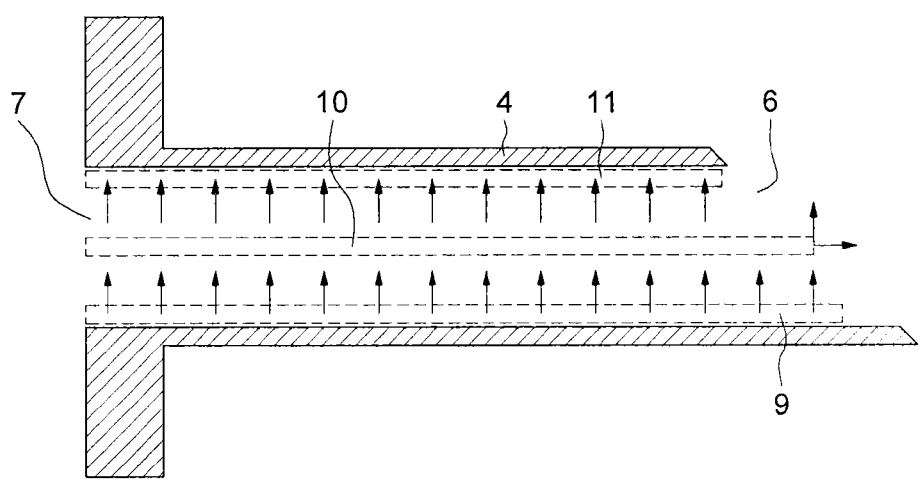
FIG. 2 illustrates a longitudinal section of a preferred embodiment of the device of the invention.

FIG. 2 show a detailed longitudinal section of a preferred embodiment for the extraction device of FIG. 1.

The extraction pipe 4 comprises means 9 for injecting a multiplicity of small jets of gas upwardly into the extraction pipe, all along the bottom length thereof. It further contains means 11 for removing the injected gas, once the gas has transversed the tube.

The extraction pipe 4 further contains means 10 for injecting an additional amount of gas at the inlet 6 of the extraction pipe 4, so as to create a localised high pressure region at the inlet 6, and thus a small pressure differential between the inlet 6 and the outlet 7 of the extraction pipe 4. Such means are made of high pressure tubes 10, which only inject additional gas at the inlet 6 of the pipe 4.

In the device of FIG. 2, the means 9 are designed in such a way that the fluidization gas is directed perpendicularly to the lengthwise axis of the pipe 4.

Figure 3:
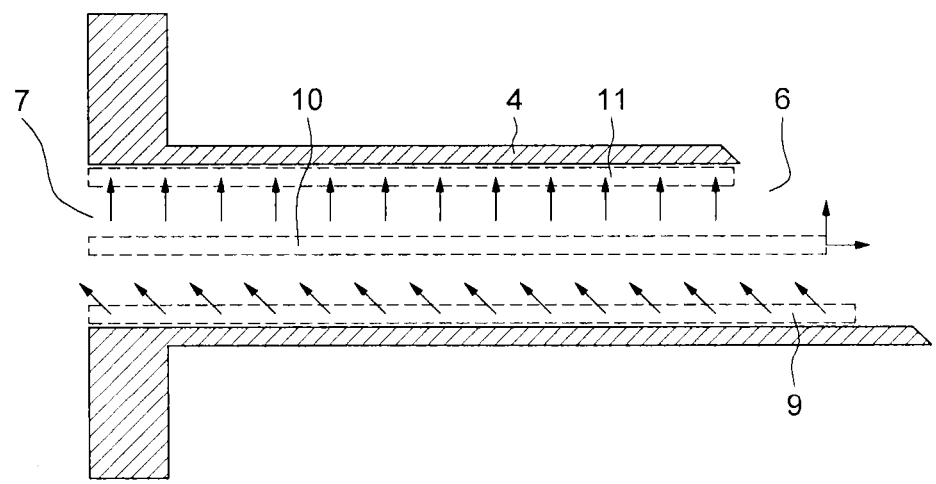
FIG. 3 shows a longitudinal section of another preferred embodiment of the device of the invention.

FIG. 3 shows another embodiment of the device of the invention, which is similar to that of FIG. 2, with the difference that the means 9 are designed in such a way that the fluidization gas is directed in an inclined direction towards the outlet 7 of the extraction pipe 4, with an inclination angle of 45 degrees with regard to the lengthwise axis of said pipe.

In both FIG. 2 and FIG. 3, the gas removal means 11 can be omitted, in which case the injected gas from means 9 will flow together with the particulate material out of exit 7.

Figure 4:
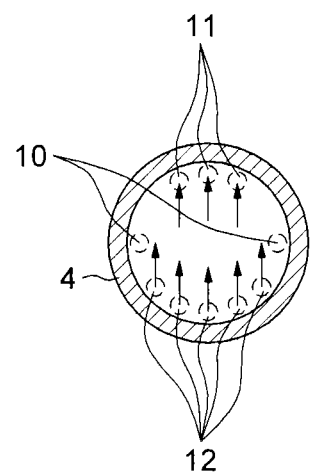
FIG. 4 illustrates a transversal section of the devices of FIGS. 2 and 3.

As shown in FIG. 4, the means 9 for injecting a multiplicity of small jets of gas upwardly into the extraction pipe 4, comprise a set of high pressure tubes 12, which are provided with small holes over their entire length, and are connected to a supply of pressurized fluidization gas not shown. In the same fashion, the gas removal means 11 is shown to comprise a set of tubes which are simply vented to atmosphere, or connected to a vacuum system to increase the rate of gas removal.

FIGS. 2, 3 and 4 further show that the means 10 can be made of two high pressure tubes 10 which inject an additional amount of gas at the inlet 6 of the extraction pipe 4.

The invention claimed is:

1. A process for unloading a bed of particles of solid catalyst from a reactor vessel, the process comprising:
    inserting a removable and portable extraction pipe into a lower part of said bed;
    injecting a fluidization gas upwardly into the extraction pipe from a bottom part thereof, along an entire length of the extraction pipe; and
    applying a positive pressure differential between an inlet and an outlet of said extraction pipe,
    wherein the fluidization gas is injected at a controlled flow rate such as to create a dense fluidized phase of said particles of solid catalyst inside the extraction pipe, along a length of the extraction pipe, and
    wherein the extraction pipe is kept horizontal.

2. The process of claim 1, wherein a small pressure differential is applied between the inlet and the outlet of the extraction pipe, so that the pressure remains slightly higher at the inlet of the extraction pipe inside the reactor vessel than at the outlet of the extraction pipe outside the reactor vessel.

3. The process of claim 2, wherein the pressure differential is applied by applying a higher pressure inside the reactor vessel.

4. The process of claim 1, wherein a part or all of the fluidization gas is removed along the length of the extraction pipe, in the upper part thereof.

5. The process of claim 1, wherein the fluidization gas is injected into the extraction pipe in an inclined direction towards the outlet of the extraction pipe, with an inclination angle with regard to the lengthwise axis of said pipe ranging from 0 to 90 degrees.

6. The process of claim 1, wherein the fluidization gas is chosen from air, water vapour, oxygen, hydrogen, inert gases such as nitrogen, and mixtures thereof in any proportions.

7. The process of claim 2, wherein the pressure differential is applied by applying a higher pressure within the bed of particles of solid catalyst, at the inlet of the extraction pipe.

8. The process of claim 1, wherein the fluidization gas is injected into the extraction pipe in an inclined direction towards the outlet of the extraction pipe, with an inclination angle with regard to the lengthwise axis of said pipe of 45 degrees.

9. The process of claim 1, wherein the fluidization gas is chosen from inert gases.

10. The process of claim 1, wherein the fluidization gas is nitrogen.

* * * * *